(12) United States Patent
Bushehri

(10) Patent No.: US 12,509,204 B2
(45) Date of Patent: Dec. 30, 2025

(54) POWER SYSTEM FOR ELECTRICAL POWER GENERATION AND DISTRIBUTION

(71) Applicant: Volvo Penta Corporation, Gothenburg (SE)

(72) Inventor: Michael Bushehri, Gothenburg (SE)

(73) Assignee: Volvo Penta Corporation, Gothenburg (SE)

( * ) Notice: Subject to any disclaimer, the term of this patent is extended or adjusted under 35 U.S.C. 154(b) by 467 days.

(21) Appl. No.: 18/106,556

(22) Filed: Feb. 7, 2023

(65) Prior Publication Data

US 2023/0264797 A1 Aug. 24, 2023

(30) Foreign Application Priority Data

Feb. 24, 2022 (EP) .................................... 22158493

(51) Int. Cl.
*B63H 21/17* (2006.01)
*B63H 21/21* (2006.01)

(52) U.S. Cl.
CPC ............ *B63H 21/17* (2013.01); *B63H 21/21* (2013.01); *B63H 2021/216* (2013.01)

(58) Field of Classification Search
CPC ... B63H 21/17; B63H 21/21; B63H 2021/216
See application file for complete search history.

(56) References Cited

U.S. PATENT DOCUMENTS

| | | | |
|---|---|---|---|
| 8,928,292 | B2 | 1/2015 | Castles et al. |
| 10,427,732 | B1 | 10/2019 | Carroll, Jr. |
| 2016/0257341 | A1 | 9/2016 | Lavoie et al. |
| 2017/0349213 | A1 | 12/2017 | Abdel-Rahman et al. |
| 2018/0118356 | A1* | 5/2018 | Armstrong ............. H02P 29/00 |
| 2021/0376602 | A1 | 12/2021 | Schulz et al. |

FOREIGN PATENT DOCUMENTS

| | | |
|---|---|---|
| CN | 111204433 A | 5/2020 |
| EP | 3318492 A1 | 5/2018 |
| WO | 2021239826 A1 | 12/2021 |

OTHER PUBLICATIONS

Danfoss Drives, "DC grids and selectivity using VACON® NXP DCGuard™," Oct. 2018, retrieved from the Internet: [URL: https://danfoss.ipapercms.dk/Drives/DD/Global/SalesPromotion/Articles/uk/vacon-nxp-dcguard/? page=1], 10 pages.

Kim, K. et al., "DC-grid system for ships: a study of benefits and technical considerations," Journal of International Maritime Safety, EnvironmentalAffairs, and Shipping, vol. 2, Issue 1, Aug. 2018, 13 pages.

Extended European Search Report for European Patent Application No. 22158493.1, mailed Sep. 1, 2022, 7 pages.

* cited by examiner

*Primary Examiner* — Stephen P Avila

(74) *Attorney, Agent, or Firm* — Withrow & Terranova, PLLC

(57) ABSTRACT

A power system for electrical power generation and distribution in a marine vessel is provided. The system includes a first direct current (DC) bus configured for powering a first load (in form of a first electrical propulsion machine), and a second DC bus configured for powering a second load (in form of a second electrical propulsion machine). The system further includes a generator which includes at least a first winding set and a second winding set. The first winding set is connected to power the first DC bus and the second winding set is connected to power the second DC bus. A marine vessel including such a power system is also provided.

14 Claims, 3 Drawing Sheets

POWER SYSTEM FOR ELECTRICAL POWER GENERATION AND DISTRIBUTION

RELATED APPLICATIONS

The present application claims priority to European Patent Application No. 22158493.1, filed on Feb. 24, 2022, and entitled "POWER SYSTEM FOR ELECTRICAL POWER GENERATION AND DISTRIBUTION," which is incorporated herein by reference in its entirety.

TECHNICAL FIELD

The present disclosure relates to the field of electrical power generation and distribution in marine vessels. In particular, the present disclosure relates to electrical power generation and distribution using multiple direct current (DC) buses.

BACKGROUND

As more and more equipment of marine vessels (such as e.g. ships) are operated electrically, there exists a need for safe and efficient ways of both onboard-generation and -distribution of electrical power. For electrical propulsion in particular, switchboard systems use busbars (i.e. buses) for transporting the electrical power from e.g. a generator or battery to an electrical propulsion machine. If equipped with multiple electrical propulsion machines, a ship will often include separate busbars for each electrical propulsion machine.

During normal operation of the ship, the above-mentioned busbars are often electrically tied together using a switching element referred to as a "bus-tie". This allows the various sources of electrical power (such as battery assemblies and/or generator sets) to be shared among the buses, and removes e.g. a need to have separate generator sets for each bus. However, as direct current (DC) is replacing traditional alternating current (AC) as the de facto standard for the buses, the bus-ties become complicated as they must be able to handle fault-situations including large DC fault currents. With the absence of natural zero-point crossings, DC fault currents are harder to interrupt than their AC counterparts, and bus-ties are consequently required to operate according to complex algorithms in order to e.g. quickly enough disconnect one bus from the other in case of e.g. a short-circuit occurring on one of the buses. In addition, the large DC fault currents may also require the dimensioning of the buses to be increased, leading to an increase in both cost, weight and build-volume of a power system including such normally tied-together buses.

Based on the above, it exists a need for an improved power system for generating and distributing electrical power using multiple DC buses.

SUMMARY

To at least partially solve the above-mentioned problems with power-generation and -distribution using multiple DC buses, and to thereby at least partially satisfy the above-mentioned need, the present disclosure provides an improved power system for electrical power generation and distribution in a marine vessel, and a marine vessel, as defined in the accompanying independent claims. Various alternative embodiments of the power system and marine vessel are defined in the dependent claims.

According to a first aspect of the present disclosure, a power system for electrical power generation and distribution in a marine vessel is provided. The power system (hereinafter also referred to as just the "system") includes a first direct current (DC) bus configured for powering a first load in form of a first electrical propulsion machine (of the marine vessel). The system includes a second DC bus configured for powering a second load in form of a second electrical propulsion machine (of the marine vessel). The system further includes a generator. The generator includes at least a first winding set and a second winding set. The first winding set is connected to power the first DC bus, and the second winding set is connected to power the second DC bus.

The first and second loads are preferably DC loads, but it may be envisaged that the first and second loads are also AC loads and that, in such a situation, required circuitry for converting DC power from the respective first and second DC buses to AC power (such as one or more inverter circuits) are then provided as part of the first and second loads. In general, an "electrical machine" or "electrical propulsion machine" is envisaged as any machine (such as e.g. an electric motor) which is configured to convert electricity into mechanical power and which, either directly or by connecting to one or more other arrangements such as propellers or similar, are capable of generating thrust such that the marine vessel can be moved across water. Such a machine may be a rotating machine or a linear machine.

The envisaged system improves upon existing, conventional technology and solutions in that the use of the multiple-winding set generator allows to power multiple buses of similar character using a single generator, and thereby removes the need for using any bus-tie to electrically tie/connect the buses together. With the bus-tie eliminated, the issues associated with the bus-tie are also resolved. In addition, the use of the generator having multiple winding sets each connected to a separate bus also provide additional redundancy not found in conventional systems. As will be explained in more detail later herein, this is in contrast to a conventional power system which requires the use of the bus-tie in order to use a single generator to power multiple buses, and wherein a failure on one bus risks disconnecting the generator also from the other bus(es).

In one or more embodiments of the system, a power rating of the first winding set may be similar (or e.g. equal) to a power rating of the second winding set. Herein, that the power ratings of the first and seconding winding sets are similar (or equal) should be understood as that they, when the generator is spinning, output similar voltages, and that they are able to provide power to two buses which have similar power requirements during normal operation of the marine vessel. That is, it is assumed that both the output voltages and e.g. average sustainable maximum currents of the first and second winding sets are similar or equal. Phrased differently, it is assumed that both the first electrical propulsion machine and the second electrical propulsion machine are of similar character.

In one or more embodiments of the system, the generator may be an alternating current (AC) generator. The system may further include a first rectifier (circuit) connected between the first winding set and the first DC bus, and a second rectifier (circuit) connected between the second winding set and the second DC bus. This such that the generated AC power from the generator may be converted to DC power before output to the first and second DC buses. There may e.g. be more than one AC-phase provided in each winding set. For example, each of the first and second winding sets may include three AC-phases, and the rectifier (circuits) may correspondingly be capable of converter three-phase AC power into DC power.

In one or more embodiments of the system, the system may not include any switching elements (such as a bus-tie) for (electrically) tying the first and second DC buses together during normal operation of the system. Herein, "normal operation of the system" is defined as a situation during which no fault occurs on e.g. the first and/or second DC buses, or on/in any subsystem or other system connected to either one of the first and second DC buses.

In one or more embodiments of the system, the system may further include a first switching element controllable to disconnect the first DC bus from the first winding set of the generator, and a second switching element controllable to disconnect the second DC bus from the second winding set of the generator. The switching elements as used here may for example be circuit breakers of various suitable designs. These switching element (or circuit breakers) may also be used to e.g. disconnect one or both of the DC buses from the generator as a response to e.g. a service demand on the to-be-disconnected DC bus(es), or similar. By so doing, service/maintenance may for example be performed on one (or both of the DC buses) without having to stop the generator.

In one or more embodiments of the system, the system may be further configured to open the first switching element during a detected failure (or fault) on the first DC bus, and to open the second switching element during a detected failure (or fault) on the second DC bus. As used herein, a failure/fault may e.g. include a DC short-circuit, a DC circuit-to-ground fault, or similar, which causes a steep increase in current which may, if not attended to, cause a failure of one or more devices through which this fault current passes.

In one or more embodiments of the system, the system may be further configured to open the first switching element during a detected failure (or fault) between the first DC bus and the first winding set of the generator, and to open the second switching element during a detected failure (or fault) between the second DC bus and the second winding set of the generator.

In one or more embodiments of the system, the system may further include a first battery assembly connected to the first DC bus, and a second battery assembly connected to the second DC bus.

In one or more embodiments of the system, the system may be further configured to, during the detected failure (or fault) between the first DC bus and the first winding set of the generator, power the first DC bus using the first battery assembly, and to, during the detected failure (or fault) between the second DC bus and the second winding set of the generator, power the second DC bus using the second battery assembly.

In one or more embodiments of the system, the system may further include a first protective fuse connected between the first DC bus and the first winding set of the generator, and a second protective fuse connected between the second DC bus and the second winding set of the generator.

In one or more embodiments of the system, the system may further include a generator set. The generator set may include a propulsion unit and the already included generator. The propulsion unit may be configured to provide rotational power to the generator. The propulsion unit may for example be a diesel engine, a petrol engine, a nuclear-powered engine, a gas turbine, or any other propulsion machine running on any fuel from which energy may be extracted and converted into mechanical power output to the generator.

In one or more embodiments of the system, the system may further include a control system configured to, during normal operation of the power system, control a speed of the propulsion unit and generator based on a highest power requirement of (one of) the first DC bus and the second DC bus (that is, a power requirement of the first DC bus may be compared with a power requirement of the second DC bus, and the highest such power requirement can be used to control the speed of the propulsion unit and generator). The control system may further be configured to, during a detected failure (or fault) on one of the first DC bus and the second DC bus, instead control the speed of the propulsion unit and the generator based on a power requirement of the other one of the first DC bus and the second DC bus (that is, if one DC bus fails, the power requirement of the other, still operating DC bus can be used to control the speed of the propulsion unit and the generator).

In one or more embodiments of the system, the control system may be further divided into a first submodule associated with the first DC bus, and a second submodule associated with the second DC bus. The control system may be configured such that, during normal operation of the system, one of the first and second submodules is a master-submodule and is responsible for controlling the speed of the propulsion unit and the generator, while the other submodule is a slave-submodule and is not responsible for controlling the speed of the propulsion unit and the generator. The control system may further be such that, during a failure of the master-submodule, the slave-submodule becomes a master-submodule and is responsible for controlling the speed of the propulsion unit and the generator.

In one or more embodiments of the system, the first submodule may be configured to determine the power requirement of the first DC bus and the second submodule may be configured to determine the power requirement of the second DC bus. The first submodule may be configured to communicate the power requirement of the first DC bus to the second submodule when the second submodule is the master-submodule. The second submodule may be configured to communicate the power requirement of the second DC bus to the first submodule when the first submodule is the master-submodule. By so doing, the submodule currently being the master-submodule may know the power requirement of the other DC bus with which the master-submodule is not associated, and use this to e.g. determine a highest power requirement of the two DC buses as discussed above.

According to a second aspect of the present disclosure, a marine vessel is provided. The marine vessel includes the first electrical propulsion machine and the second electrical propulsion machine. The marine vessel also includes a power system as envisaged herein, e.g. a power system according to the first aspect or any embodiments thereof for powering the first and second electrical propulsion machines.

Other objects and advantages of the present disclosure will be apparent from the following detailed description, the drawings and the claims. Within the scope of the present disclosure, it is envisaged that all features and advantages described with reference to e.g. the (power) system of the first aspect are relevant for, apply to, and may be used in combination with also any feature and advantage described with reference to the marine vessel of the second aspect, the, and vice versa.

BRIEF DESCRIPTION OF THE DRAWINGS

Exemplifying embodiments will now be described below with reference to the accompanying drawings, in which.

Figure 1A:
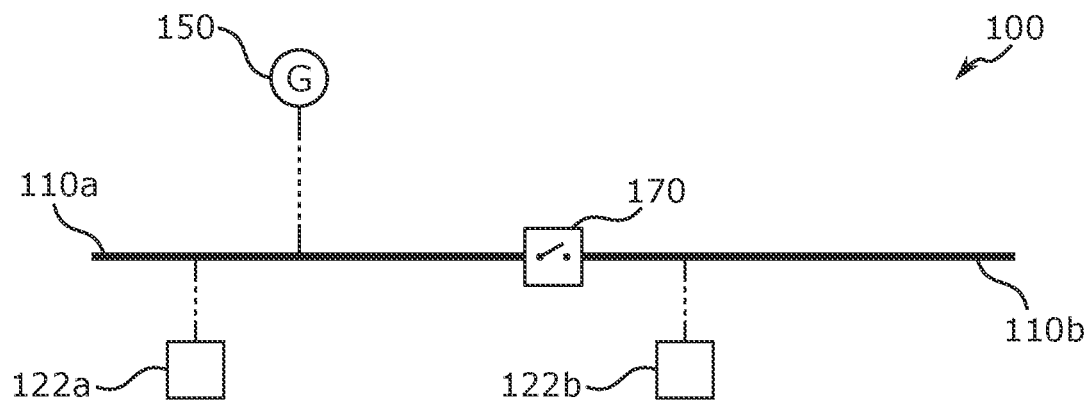
FIGS. 1A and 1B schematically illustrate various examples of conventional power systems.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the Figures, the (absolute or relative) sizes of elements and regions may be exaggerated or understated vis-à-vis their true values for illustrative purposes and, thus, are provided to illustrate the general structures of the embodiments.

DETAILED DESCRIPTION

Various examples of conventional power systems for marine vessels will now be explained in more detail with reference to FIGS. 1A and 1B. In the remaining parts of the description, the terms "power system" and just "system" will be used interchangeably.

FIG. 1A schematically illustrates a generalized concept of a conventional power system 100, which is used to generate and distribute electrical power within a marine vessel. In the system 100, a generator 150 is used to generate electrical power. The generated electrical power is provided to a first direct current (DC) bus 110a. If the generator 150 outputs alternating current (AC) power, it is envisaged that the system 100 includes additional components (not shown) needed to first transform the AC power to DC power before connecting to the first DC bus 110a. Such additional components may for example include one or more rectifiers or similar.

The first DC bus 110a is used to distribute the DC power to a first DC load 122a. The first DC load 122a is for example an electrical machine, such as an electrical propulsion machine used to propel the marine vessel. The system 100 also includes a second DC bus 110b, which is used to distribute DC power to a second DC load 122b. The second DC load 122b may be similar to the first DC load 122a, and may for example also be an electrical propulsion machine used to propel the marine vessel. For example, it may be envisaged that the first DC load 122a is an electrical propulsion machine used to spin a first propeller arranged at one side of the aft of the marine vessel, while the second DC load 122b is another electrical propulsion machine used to spin a second propeller arranged at another side of the aft of the marine vessel. Other arrangements are of course also possible, but it is at least assumed that the first DC load 122a and the second DC load 122b are both electrical propulsion machines used to generate thrust to move the marine vessel across water. The loads 122a and 122b may also be other components than electrical machines, but it is still to be assumed that the loads 122a and 122b have similar characteristics in terms of power consumption and loading, such that power requirements of the first DC bus 110a and the second DC bus 110b are similar or even equal.

In the system 100, the single generator 150 is responsible for providing electrical power to both DC buses 110a and 110b. In order to do this, the second DC bus 110b is, during normal operation of the system 100, electrically connected to the first DC bus 110a via a switching element 170, such that electrical power from the generator 150 may be transferred to the second DC bus 110b via the first DC bus 110a. The switching element 170 may be referred to as a "bus-tie", a "bus-tie switch", or similar, as it electrically ties the two DC buses 110a and 110b together. The bus-tie 170 is also responsible for disconnecting the two DC buses 110a and 110b in case an electrical fault (such as a short-circuit, circuit-to-ground fault, or similar) is detected on one of the DC buses 110a and 110b, in order to e.g. avoid damaging the other DC bus (or any electrical components connected thereto) due to a fault current arising due to the electrical fault.

The various components of the system 100 located between the generator and the DC loads 122a and 122b may for example be referred to as a "switchboard", as it switches/routes power from where the power is being generated (at the generator 150) to where the power is being consumed (at the loads 122a and 122b).

Figure 1B:
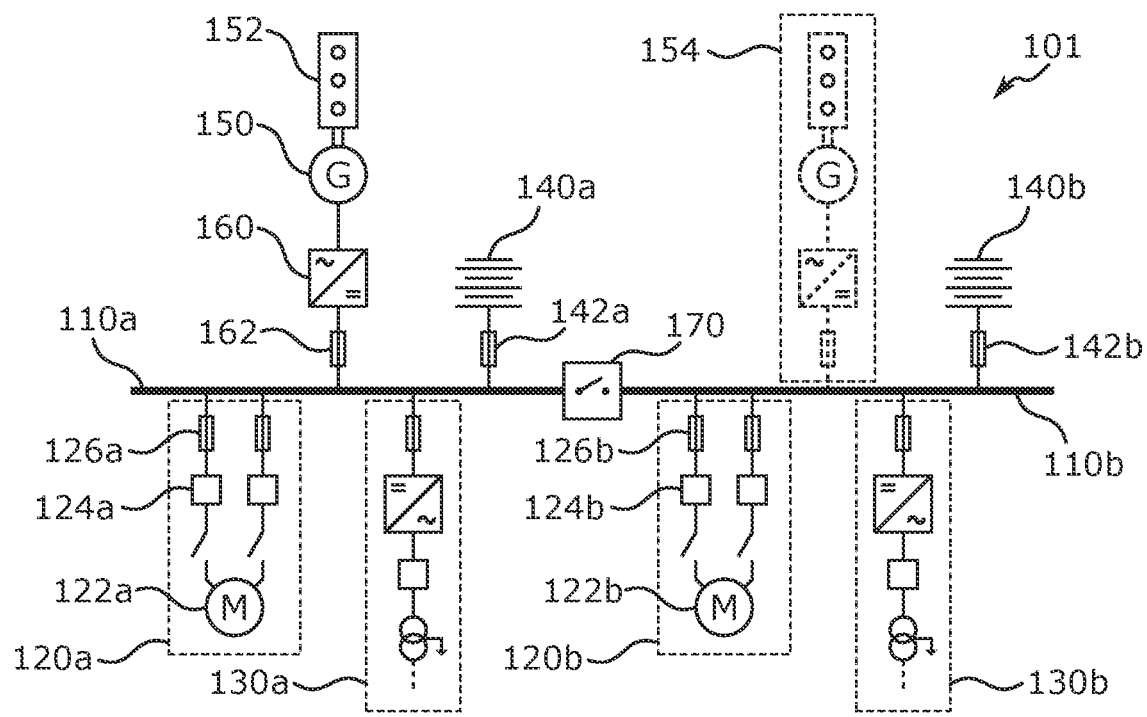

FIG. 1B schematically illustrates a more detailed example of a conventional power system 101 which follows the principle of the system 100 described above with reference to FIG. 1A. In the system 101, the generator 150 is an AC generator which is spun by a diesel engine 152 (i.e., the generator 150 and diesel engine 152 together form part of a so-called "genset" or "generator set"). The AC power generated by the generator 150 is converted to DC power by a rectifier 160. The rectifier 160 is connected to the first DC bus 110a via a protective fuse 162.

The first DC load in the system 101 is a first electrical machine 122a which forms part of a first electrical propulsion subsystem 120a. In the subsystem 120a, the first electrical machine 122a is connected to the first DC bus 110a via a motor control unit 124a and a protective fuse 126a. As illustrated in FIG. 1B, there may also be one or more additional branches connecting the first electrical machine 122a to the first DC bus 110a, and also including e.g. such a motor control unit and protective fuse. The exact configuration of the first electrical propulsion subsystem 120a may of course vary, as long as it includes at least the first DC load in form of e.g. the first electrical machine 122a.

A first so-called "hotel load" system 130a may also be connected to the first DC bus 110a. The first hotel load system 130a may for example be used to tap DC power from the first DC bus 110a, and to distribute this power to one or more other components (so-called "hotel loads") of the marine vessel such as e.g. ventilation fans, lighting arrangements, heating arrangements, or any other components which also requires electrical power to operate. If some of the components powered via the first hotel load system 130a require AC power, the first hotel load system 130a may include one or more inverter circuits or similar. As is often the case, the required voltage of a hotel load system is often less, or even substantially less, than that of a propulsion (sub-)system, and the first hotel load system 130a may, for this cause, also include e.g. one or more transformer circuits or similar in order to reduce the voltage of the first DC bus 110a to a voltage more suitable for the components powered via the first hotel load system 130a. Although not shown in FIG. 1B, there may of course also be various other subsystems connected to, and powered from, the first DC bus 110a.

The system 101 also optionally includes a first battery assembly 140a connected to the first DC bus 110a. The first battery assembly 140a may for example be charged by the generator 150 via the first DC bus 110a, and be used to power the first DC bus 110a e.g. when/if the generator 150 is not running, or if a power requirement on the first DC bus 110a exceeds the maximal output of the generator 150. For example, it may be envisaged also that the first battery assembly 140a can be charged while the marine vessel is docked in harbor, or similar, and that the generator 150 and the diesel engine 152 is used only when the battery assembly 140a is sufficiently drained, and/or when a maximum power output of the battery assembly 140a is not sufficient to meet a power requirement on the first DC bus 110a. From another point-of-view, as often utilized in e.g. train engines, the superior ability of electrical machines to provide higher torque at low speeds, compared to e.g. the diesel engine 152, may cause the more complicated chain of diesel engine 152→generator 150→rectifier 160→DC bus 110a→DC electrical machine 122a→propeller to still be more desirable than to e.g. drive the propeller directly from the diesel engine 152 itself. Such a power system which uses different energy sources (both e.g. diesel and electrical energy) to provide propulsion may be referred to as a hybrid propulsion system, or similar.

The system 101 also includes the second DC bus 110b, which may, for the present illustrative example, be considered as being a replicate of the first DC bus 110a and including similar systems connected thereto. A second electrical propulsion subsystem 120b is connected to the second DC bus 110b, where the second subsystem 120b includes a second electrical propulsion machine 122b connected to the second DC bus 110b via a motor control unit 124b and a protective fuse 126b. A second hotel load system 130b is also connected to the second DC bus 110b. A second battery assembly 140b is also optionally connected to the second DC bus 110b, such that the second DC bus 110b may be powered from the second battery assembly 140b instead of from, or in addition to, the generator 150, as described above when discussing the first battery assembly 140a.

As described above with reference to FIG. 1A, the switching element (bus-tie) 170 is provided to, during normal operation of the system 101, electrically connect/tie-together the first DC bus 110a and the second DC bus 110b such that e.g. electrical power from the generator 150 is available on both DC buses 110a and 110b. This in order to allow sharing of resources, such as the single generator 150, among both DC buses 110a and 110b. As also described above, the bus-tie 170 is also configured to electrically disconnect the two DC buses 110a and 110b in case of e.g. a failure detected on one of the DC buses 110a and 110b, or e.g. in case of a failure detected in the branch including the generator 150, or a failure detected in any of the various (sub-)systems 120a, 130a, 140a, 120b, 130b, and 140b, connected to the DC buses 110a and 110b, such that e.g. the resulting fault current does not risk damaging both DC buses 110a and 110b.

When the two DC buses 110a and 110b are electrically connected, the first battery assembly 140a may also be used to provide power to the second DC bus 110b, and the second battery assembly 140b may also be used to provide power to the first DC bus 110a. This adds a certain amount of redundancy to the system 101, as one of the battery assemblies 140a and 140b may thus be used to power both DC buses 110a and 110b in case the other one of the battery assemblies fail.

The present disclosure is based on a realization that the conventional system 101 (and/or the conventional system 100) as described with reference to FIGS. 1A and 1B may be less than optimal in several aspects. Some of these potential downsides/disadvantages of the conventional system 101 (and the conventional system 100) will now be described in more detail.

A first disadvantage arises from that the two DC buses 110a and 110b are both powered from a single generator 150. This requires that the dimensioning of the busbars used to construct the DC buses 110a and 110b is increased such that each DC bus 110a and 110b may carry a current which is larger than would be the case if the two DC buses 110a and 110b were always electrically disconnected. For example, if the generator 150 can provide power to both of the electrical machines 122a and 122b, at least the first DC bus 110a must be dimensioned to transport a larger electrical power as the electrical power for the second electrical machine 122b is, in addition to that for the first electrical machine 122a, also transported via the first DC bus 110a. In addition, taking potential short-circuits into account, both DC buses 110a and 110b must also be dimensioned to withstand a higher short-circuit current. As the dimensioning of busbars used to construct the DC buses 110a and 110b increases, so does the amount of material (e.g. copper) that is used, which in turn results in higher costs, larger weight, and also an overall larger size of the switchboard (e.g. including the DC buses 110a and 110b).

A second disadvantage arises from that the bus-tie 170 must be configured to break large DC currents in case of e.g. a short-circuit on one of the DC buses 110a and 110b. Without any natural zero-crossing points (as found in corresponding AC systems), this requires a more complex switching element 170 and a more advanced control system for opening the bus-tie 170 as quickly as possible in case of the electrical fault. The calculations of the resulting short-circuit currents in the conventional systems are also more complex. The complications arising from being able to properly break large DC currents in order to electrically disconnect the two DC buses 110a and 110b in cause of a fault thus likely leads to an increased cost of production and maintenance, and to an increased weight and size of the overall system. In some situations, the presence of the bus-tie 170 may also provide a potential risk for an operator of the conventional system, as opening or closing the bus-tie 170 (by mistake) when the system is up and running may be both harmful and even lethal to the operator due to the high DC currents involved.

A third disadvantage arises from that there is only a single generator 150, and from that the second DC bus 110b is only indirectly (via the first DC bus 110a) connected to the generator 150. If looking at the conventional system 101 illustrated in FIG. 1B, and assuming that a short-circuit fault occurs somewhere in e.g. the first electrical propulsion subsystem 120a, the resulting short-circuit current will most likely blow the protective fuse 126a. In case of a short-circuit somewhere on the first DC bus 110a itself, the resulting fault current will likely blow some or all of the protective fuses 126a, 142a and 162, and the bus-tie 170 should be opened as soon as possible in order to protect the second DC bus 110b. In such a situation, it can be seen from FIG. 1B that both the first electrical propulsion subsystem 120a and the branch including the generator 150, and possibly also the branch including the first battery assembly 140a, will be out-of-service. If the opening of the bus-tie 170 is done quickly enough, the second electrical propulsion subsystem 120b may potentially be left operating. However, as the generator 150 is no longer available to power the second DC bus 110b, power will be supplied only from the second battery assembly 140b. If the second battery assembly 140b is not sufficiently charged at the time of the fault, the marine vessel may have troubles reaching e.g. a nearest harbor before the second battery assembly 140b is completely drained.

One potential way of overcoming this third disadvantage in a conventional system is, as illustrated in FIG. 1B, to add an optional second generator branch 154 (i.e. a second generator set/genset) connecting to the second DC bus 110b. By so doing, sufficient power would be provided to the second DC bus 110b even after a fault occurring at the side of the first DC bus 110a. However, adding an additional generator branch 154 would result in an increased cost, weight, and size of the overall system 101.

The present disclosure aims to solve the above discussed shortcomings of the conventional system 101 (and of the conventional system 100) by providing an improved power system for generation and distribution of power in a marine vessel. Exemplifying embodiments of the envisaged improved system will now be described more fully hereinafter with reference to FIGS. 2A and 2B of the accompanying drawings. These parts of the drawings show currently preferred embodiments, but the invention may, however, be embodied in many different forms and should not be construed as limited to the embodiments set forth herein; rather, these embodiments are provided for thoroughness and completeness, and fully convey the scope of the present disclosure to the skilled person.

Figure 2A:
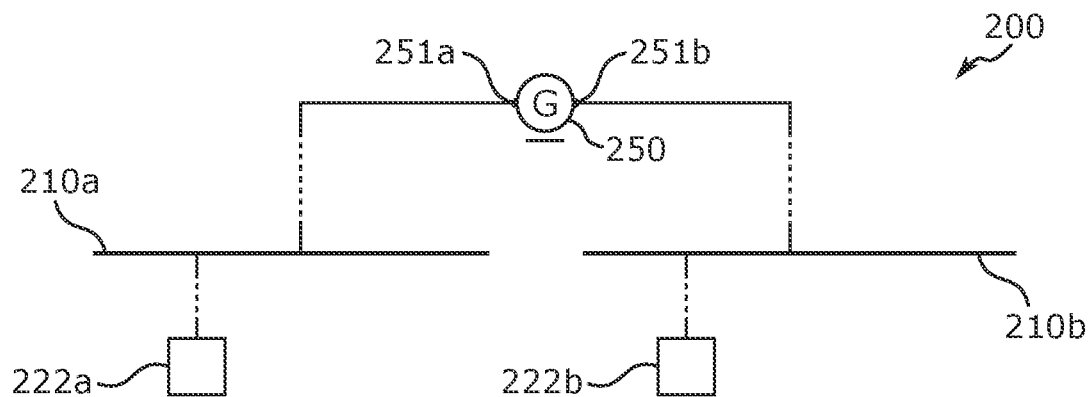
FIGS. 2A and 2B schematically illustrate various embodiments of a power system according to the present disclosure.

FIG. 2A schematically illustrates an embodiment of an improved power system 200 according to the present disclosure. The system 200 includes a first DC bus 210a and a second DC bus 210b. The first DC bus 210a is configured for powering (i.e. to distribute power to) a first (DC) load in form of a first electrical propulsion machine 222a, and the second DC bus 210b is configured for powering (i.e. to distribute power to) a second (DC) load in form of a second electrical propulsion machine 222b.

The system 200 further includes a generator 250. The generator 250 is (as illustrated by the bar drawn under the circular symbol) different from the generator 150 of the conventional systems 100 and 101 (as described earlier herein with reference to FIGS. 1A and 1B) in that the generator 250 is configured with multiple, galvanically isolated winding sets, and includes at least a first winding set 251a and a second winding set 251b. The first winding set 251a is connected to (power) the first DC bus 210a, and the second winding set 251b is connected to (power) the second DC bus 210b.

By using the generator 250 having multiple winding sets 251a and 251b, and by connecting each winding set to a respective DC bus, the system 200 does not need to include any switching element (bus-tie) for connecting the first DC bus 210a and second DC bus 210b together. This eliminates the issues of the conventional systems relating to such a bus-tie, i.e. at least the issues with the conventional systems described as the "first disadvantage" and/or the "second disadvantage" above. For example, as there is no bus-tie required, there is no need to increase the dimensioning of the busbars used to create the first and second DC buses 210a and 210b, as each DC bus is only required to carry current sufficient to power its own respective electrical propulsion machine 222a and 222b (and not also that of the other DC bus). This thus eliminates the issues described above as part of the first disadvantage of the conventional systems, and the system 200 can be made smaller in size, lighter in weight, and cheaper in cost compared to the conventional systems. Likewise, without any bus-tie, the issues described above as part of the second disadvantage of the conventional systems are also resolved, as there is no need in the system 200 for any complex control systems required to interrupt/break large DC currents passing from one DC bus to the other DC bus. Finally, the use of the multiple-winding set generator 250 allows the generator to continue providing power to one DC bus 210a or 210b if a fault occurs in the other DC bus 210b or 210a, thus eliminating at least some of the issues described above as part of the third disadvantage of the conventional systems.

In one embodiment of the system 200, it may be assumed that the power ratings (e.g. in terms of maximum sustainable average current) of the winding sets 251a and 251b are similar, and e.g. that the power requirements (at least on average) of the loads (i.e. electrical propulsion machines) 222a and 222b are also similar. It is also assumed that the desired voltages on the first DC bus 210a and 210b are assumed to be approximately equal (or completely equal), and that similar (or even equal) voltages are provided at the first and second winding sets 251a and 251b of the generator 250 when the generator 250 is running (during normal operation of the system 200).

Various additional embodiments of the system 200 will now be described with reference to FIG. 2B, which schematically illustrates a system 201 which follows the principle of the system 200 described with reference to FIG. 2A.

The system 201 includes multiple additional features, which may each be considered to constitute an embodiment of the system 200. Phrased differently, although the system 201 is illustrated as including multiple detailed features, it is envisaged herein that a system being an alternative embodiment of the system 200 may include only one, two, a few, less than all, or all of the features illustrated in the system 201. The system 201 is thus provided for illustrative purposes only, and the present disclosure envisages that an improved system may be embodied and formed from any combination of any (e.g. one, two, a few, almost all, all, etc.) of the various features that will now be described, in addition to those already disclosed with reference to the system 200 illustrated in FIG. 2A. This as long as the resulting combination provides an improvement over the conventional systems such as described with reference to FIGS. 1A and 1B.

In one or more embodiments, the generator 250 may for example be an AC generator. Here, the term winding "set" is used to indicate that there may be windings for more than one AC phase in each set. For example, the first winding set 251a may provide windings for three AC phases, while the second winding set 251b may e.g. also provide windings for three AC phases. In order to convert the AC power generated by the generator 250 to DC power, the system 200 may further include a respective rectifier (not shown) connected between each of the first and second winding sets 251a and 251b and the first and second DC buses 210a and 210b.

In one or more embodiments, the systems 200 and 201 may explicitly not contain any switching element (i.e. a bus-tie) for electrically connecting/tying the first and second DC buses 210a an 210b together during normal operation of the system 201, and/or for electrically disconnecting/untying the first and second DC buses 210a and 210b during e.g. a fault situation in the system 201.

In one or more embodiments, the systems 200 and 201 may further include a respective switching element 272a and 272b (e.g., circuit breaker) in between each winding set 251a and 251b and the respective first and second DC buses 210a and 210b. Each such switching element 272a and 272b may be controllable to disconnect the respective winding set 251a and 251b from the respective DC bus 210a and 210b. This may occur e.g. during a detected fault on the respective first and second DC buses 210a and 210b. This may also occur during a detected fault between the first winding set 251a and the first DC bus 210a, and/or during a detected fault between the second winding set 251b and the second DC bus 210b. The detected fault upon which the opening of at least one of the switching elements 272a and 272b is triggered may also be e.g. a fault somewhere internal to the generator, such as somewhere within the first winding set 251a and/or within the second winding set 251b. The switching elements 272a and 272b may thus be used to protect the system 201 such that fault currents caused in one part of the system 201 are not allowed to reach other parts of the system 201. In particular, the switching elements 272a and 272b may be opened if detecting a fault on the AC-side of the system 201, i.e. between any of the rectifiers 260a and 260b and the generator 250, thus protecting e.g. the respective rectifier 260a and 260b and first and second DC buses 210a and 210b.

In one or more embodiments, the systems 200 and 201 may include one or more battery assemblies. For example, there may be a first battery assembly 240a connected to the first DC bus 210a, and another, second battery assembly 240b connected to the second DC bus 210b. The battery assemblies 240a and 240b may be charged by the generator 250 via the respective first and second DC buses 210a and 210b, and help to provide power to the respective first and second DC buses 210a and 210b and on to the respective first and second loads/electrical propulsion machines 222a and 222b. For example, the system 200 may be configured to, during a detected failure between the first DC bus 210a and the first winding set 251a, power the first DC bus 210a using a battery assembly connected to the first DC bus 210a. Likewise, the system 200 may be configured to, during a detected failure between the second DC bus 210b and the second winding set 251b, power the second DC bus 210b using a battery assembly connected to the second DC bus 210b. Electrical power may of course also be provided from the battery assemblies 240a and 240b during normal operation of the systems 200 and 201. Each battery assembly 240a and 240b may be connected to the respective DC bus 210a and 210b via a respective protective fuse 242a and 242b. The protective fuses 242a and 242b may be configured to blow if a fault somewhere on the first and second DC buses 210a and 210b results in a surge in current from the respective battery assembly 240a and 240b, thereby protecting both the respective battery assembly 240a and 240b and reducing the feeding of short-circuit current on the affected DC bus.

In one or more embodiments, the systems 200 and 201 may further include one or more additional protective fuses. For example, a first protective fuse 262a may be provided/connected between the first DC bus 210a and the first winding set 251a, and/or a second protective fuse 262b may be provided/connected between the second DC bus 210b and the second winding set 251b.

In one or more embodiments, the systems 200 and 201 may further include a propulsion unit 252 configured to spin (i.e. to provide rotational power to) the generator 250, such that the generator 250 may generate the AC power. The propulsion unit 252 may e.g. be a diesel engine, a petrol engine, a gas turbine, a nuclear-powered engine, or any other type of propulsion unit suitable to spin the generator 250. The propulsion unit 252 and the generator 250 may form part of a generator set (or genset).

Optionally, there is also connected respective first and second hotel load systems 230a and 230b to the respective first and second DC buses 210a and 210b. As described earlier herein, such hotel load systems may include e.g. various other components of the marine vessel which needs power (such as ventilation fans, pumps, fridges, lighting arrangements, loudspeakers, electrical sockets for household electrical appliances, etc.). Often, such additional components require a lower voltage than that provided on the first and second DC buses 210a and 210b, and the first and second hotel load systems 230a and 230b may then include e.g. one or more transformers for stepping-down the voltage, and/or various inverter circuits if AC power is required by some of the additional components. There may also be e.g. only one hotel load system, connected either to the first DC bus 210a or to the second DC bus 210b, or there may be more than one hotel load system connected to one or each of the first and second DC buses 210a and 210b. The hotel-loads do not form part of the core of the proposed improved systems 200 and 201, and may be completely left out of the systems 200 and 201. If included, the hotel load systems 230a and 230b may for example be similar or the same as the hotel load systems 130a and 130b described with reference to the conventional system 101 depicted in FIG. 1B.

Figure 2B:
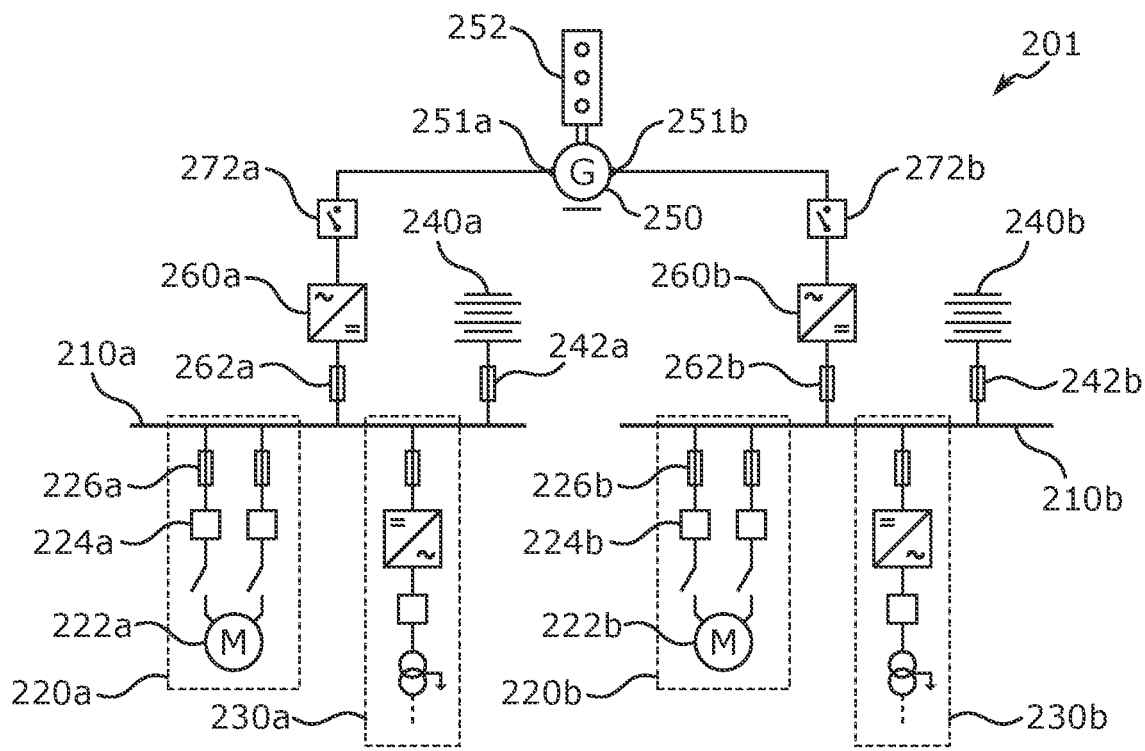

Using e.g. FIG. 2B for reference, it is seen that if a fault occurs e.g. in the first electrical propulsion subsystem 220a, the resulting fault current will likely blow the protective fuse 262a, and probably one or both of the protective fuses 226a and 242a. However, as the generator 250 does not feed both DC buses 210a and 210b with power using a same winding set (as is otherwise the case in the conventional systems described earlier herein), the generator 250 may continue to power the second DC bus 210b via the second winding set 251b. Likewise, a fault occurring on the second DC bus 210b will most likely blow the protective fuse 262b, and the generator 250 can continue with powering the first DC bus 210a via the first winding set 251a. In case of a fault on one DC bus, the electrical propulsion subsystem on the other DC bus would thus still be fully operational and still powered by the generator, and the risk of not reaching a nearest harbor due to not having sufficient battery assembly power left is thus reduced or eliminated.

As envisaged herein, in one or more embodiments, the systems 200 and 201 may also include a control system as will now be described in more detail with reference to FIG. 2C.

Figure 2C:
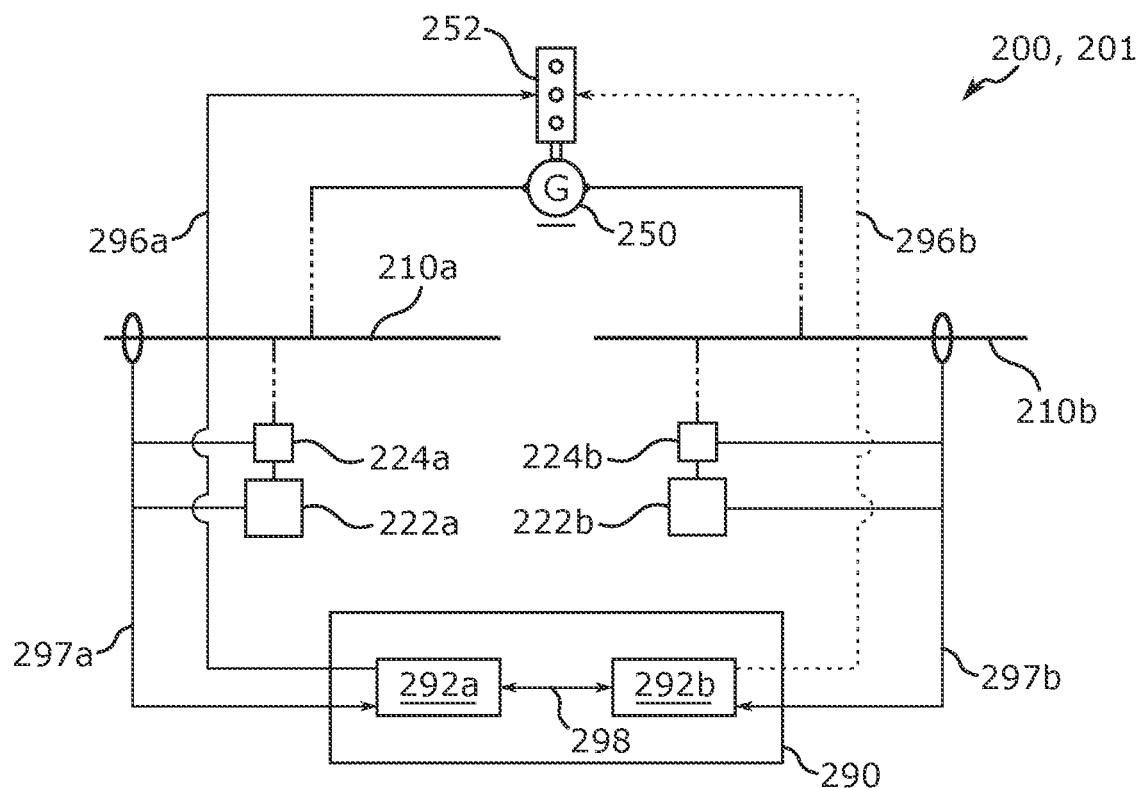
FIG. 2C schematically illustrates a control system included in one or more embodiments of a power system according to the present disclosure, and FIG. 3 schematically illustrates an embodiment of a marine vessel according to the present disclosure.

FIG. 2C schematically illustrates the system 200,201 and an included control system 290. The control system 290 may be configured to, during normal operation of the system 200, 201 (i.e. when no short-circuit fault, circuit-to-ground fault, or similar, is detected anywhere in the system 200, 201), control a rotational speed (e.g. rounds-per-minute, rpm) of the propulsion unit 252 based on a power requirement of one or both of the first DC bus 210a and the second DC bus 210b. For example, the required speed of the propulsion unit 252 may be set based on the one of the first and second DC buses 210a and 210b having a highest power requirement/demand. For example, the control system 290 may detect a required power on the first DC bus 210a, a required power on the second DC bus 201b, and then compare which of these power requirements that are the highest power requirement.

As both winding sets 251a and 251b form part of the same generator 250, adjusting the speed of the generator 250 and propulsion unit 252 to match the highest power requirement of the two DC buses 210a and 210b will thus also provide sufficient power for the other DC bus. Of course, the generator 250 may be harder to turn if the power requirements of both DC buses are both high, but it is envisaged that the propulsion unit 252 is capable of providing the required mechanical power to obtain the desired speed of the generator 250.

The control system 290 may further be configured to, in case a fault is detected on one of the first and second DC buses 210a and 210b, set the required speed of the propulsion unit 252 and the generator 250 based on a power requirement/demand of the one of the first and second DC buses 210a and 210b not affected by the detected fault.

In one or more embodiments, the control system 290 may be divided into two submodules 292a and 292b (i.e. one submodule for each DC bus), wherein the first submodule 292a is associated with (i.e. is responsible for e.g. detecting a power requirement of, as indicated by the arrow 297a) the first DC bus 210a, and wherein the second submodule 292b is associated with the second DC bus 210b (as indicated by the arrow 297b).

The control system 290 may, in some embodiments, be configured such that during normal operation of the system 200, 201, the first submodule 292a operates as (i.e. is) a master-submodule that is responsible for controlling the speed of the propulsion unit 252 and the generator 250 (as indicated by the arrow 296a), while the other, second submodule 292a may simultaneously operate as (i.e. be) a slave-submodule which is not responsible for controlling the speed of the propulsion unit 252 and the generator 250. The control system 290 may be further configured such that, during a (detected) failure of the master-submodule 292a, the second submodule 292b becomes the (new) master-submodule and takes over the responsibility for controlling the speed of the propulsion unit 252 and the generator 250 (as indicated by the arrow 296b).

In one or more embodiments, the first submodule 292a may be configured to determine the power requirement of the first DC bus 210a, and the second submodule 292b may be configured to determine the power requirement of the second DC bus 210b. Determining a power requirement on a DC bus may for example include measuring a voltage and/or current on the DC bus, and/or to communicate with various components connected to, and powered from, a DC bus in order to estimate how much power that is or will be required to power these components (as illustrated by the arrows 297a and 297b). Such components may for example be the two electrical propulsion machines 222a and 222b, and communication may be made with e.g. engine control units 224a and 224b which can be assumed to know about the power requirements of the electrical propulsion machines 222a and 222b. For example, a desired/required speed of each electrical propulsion machine 222a and 222b may be converted into a power requirement, etc.

The two submodules 292a and 292b may communicate with each other (as indicated by the arrow 298). For example, the first submodule 292a may be configured to communicate the power requirement of the first DC bus 210a to the second submodule 292b when the second submodule 292b is operating as the master-submodule, such that the second submodule 292b may know which of the two DC buses 210a and 210b that has the highest power requirement. Likewise, the second submodule 292b may be configured to communicate the power requirement of the second DC bus 210b to the first submodule 292a when the first submodule 292a is operating as the master-submodule.

In particular, the division of the control system 290 into submodules allows for the control system 290 to operate even if one submodule 292a or 292b would fail, as the other submodule 292b or 292a may then take over the responsibility of the failed submodule 292a or 292b.

The present disclosure also envisages and provides a marine vessel making use of the envisaged power system 200, 201, as will now be described in more detail with reference to FIG. 3.

Figure 3:
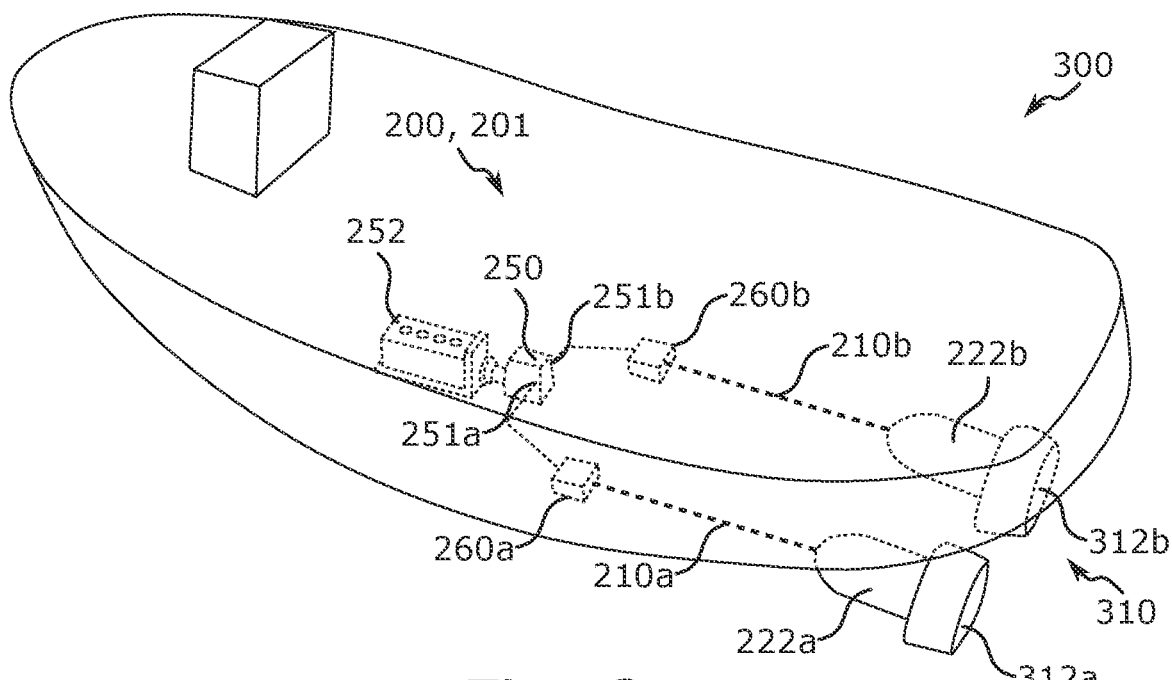

FIG. 3 schematically illustrates a marine vessel 300 in form of a ship. The ship 300 includes a first electrical propulsion machine 222a configured to spin a first propeller 312a arranged at the port/left side of the aft 310 of the ship 300, and a second electrical propulsion machine 222b configured to spin a second propeller 312b arranged at the starboard/right side of the aft 310 of the ship 300. The ship 300 further includes a power system 200, 201 as described herein with reference e.g. to FIGS. 2A and 2B. The power system 200, 201 includes e.g. the generator 250 having the first winding set 252a and the second winding set 251b, the propulsion unit 252 for spinning the generator 250, the first DC bus 210a connected to the first winding set 251a of the generator 250, and the second DC bus 210b connected to the second winding set 251b of the generator 250. The first DC bus 210a powers the first electrical propulsion machine 222a, while the second DC bus 210b powers the second electrical propulsion machine 222b. The generator 250 is here assumed to be an AC generator, and the respective first and second rectifiers 260a and 260b are thus also included to convert the generated AC power to DC power provided to the first and second DC buses 210a and 210b. Other features of the system 200, 201 as described earlier herein may of course also be included as part of the system 200, 201 of the ship 300, although such features are not shown in FIG. 3.

In summary, the present disclosure improves upon commonly available technology in that the use of a generator having multiple winding sets allows to individually power multiple DC buses using a single generator. In particular, this eliminates the need for any bus-tie for connecting the DC buses together during normal operation of the system, as each DC bus is powered separately from the generator 250, and without the power generated at the generator having to travel through one DC bus before reaching the other DC bus. The envisaged system and marine vessel also provide an improved redundancy compared with conventional systems, as the generator is, during a fault on one of the DC buses, still able to continue feeding the remaining DC buses of the system. By avoiding the need for a bus-tie, the power system may be constructed at a lower cost, weight, and overall size.

Although features and elements may be described above in particular combinations, each feature or element may be used alone without the other features and elements or in various combinations with or without other features and elements. Additionally, variations to the disclosed embodiments may be understood and effected by the skilled person in practicing the claimed invention, from a study of the drawings, the disclosure, and the appended claims.

In the claims, the words "comprising" and "including" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A power system for electrical power generation and distribution in a marine vessel, comprising:
    a first direct current (DC) bus configured for powering a first electrical propulsion machine for moving the marine vessel across water,
    a second DC bus configured for powering a second electrical propulsion machine also for moving the marine vessel across water, and a generator comprising at least a first winding set and a second winding set, wherein the first winding set is connected to power the first DC bus but not the second DC bus, and the second winding set is connected to power the second DC bus but not the first DC bus, and wherein the power system does not comprise any switching element for electrically tying the first and the second DC buses together during normal operation of the power system.

2. The power system of claim 1, wherein a power rating of the first winding set is equal to that of the second winding set.

3. The power system of claim 1, wherein the generator is an alternating current (AC) generator, and wherein the power system further comprises a first rectifier connected between the first winding set and the first DC bus and a second rectifier connected between the second winding set and the second DC bus.

4. The power system of claim 1, further comprising a first switching element controllable to disconnect the first DC bus from the first winding set of the generator, and a second switching element controllable to disconnect the second DC bus from the second winding set of the generator.

5. The power system of claim 4, wherein the system is further configured to open the first switching element during a detected failure on the first DC bus, and to open the second switching element during a detected failure on the second DC bus.

6. The power system of claim 4, wherein the system is further configured to open the first switching element during a detected failure between the first DC bus and the first winding set of the generator, and to open the second switching element during a detected failure between the second DC bus and the second winding set of the generator.

7. The power system of claim 1, further comprising a first battery assembly connected to the first DC bus, and a second battery assembly connected to the second DC bus.

8. The power system of claim 7, wherein the system is further configured to, during a detected failure between the first DC bus and the first winding set of the generator, power the first DC bus using the first battery assembly, and to, during a detected failure between the second DC bus and the second winding set of the generator, power the second DC bus using the second battery assembly.

9. The power system of claim 1, further comprising a first protective fuse connected between the first DC bus and the first winding set of the generator, and a second protective fuse connected between the second DC bus and the second winding set of the generator.

10. The power system of claim 1, further comprising a generator set including a propulsion unit and the generator, wherein the propulsion unit is configured to provide rotational power to the generator.

11. The power system of claim 9, further comprising a control system configured to, during normal operation of the power system, control a speed of the propulsion unit and the generator based on a highest power requirement of the first DC bus and the second DC bus and, during a detected failure on one of the first DC bus and the second DC bus, instead control the speed of the propulsion unit and the generator based on a power requirement of the other one of the first DC bus and the second DC bus.

12. The power system of claim 11, wherein the control system is divided into a first submodule associated with the first DC bus and a second submodule associated with the second DC bus, wherein the control system is configured such that, during normal operation of the power system, one of the first and the second submodules is a master-submodule and is responsible for controlling the speed of the propulsion unit and the generator, while the other one of the first and the second submodules is a slave-submodule not responsible for controlling the speed of the propulsion unit and the generator, and such that, during a failure of the master-submodule, the slave-submodule becomes a master-submodule and is responsible for controlling the speed of the propulsion unit and the generator.

13. The power system of claim 12, wherein the first submodule is configured to determine the power requirement of the first DC bus and the second submodule is configured to determine the power requirement of the second DC bus, and wherein the first submodule is configured to communicate the power requirement of the first DC bus to the second submodule when the second submodule is the master-submodule, and wherein the second submodule is configured to communicate the power requirement of the second DC bus to the first submodule when the first submodule is the master-submodule.

14. A marine vessel, comprising:
a first electrical propulsion machine and a second electrical propulsion machine for moving the marine vessel across water, and
the power system of claim 1 for powering the first and the second electrical propulsion machines.

* * * * *